US008019756B2

(12) United States Patent
Murakami et al.

(10) Patent No.: US 8,019,756 B2
(45) Date of Patent: Sep. 13, 2011

(54) COMPUTER APPARATUS, COMPUTER PROGRAM AND METHOD, FOR CALCULATING IMPORTANCE OF ELECTRONIC DOCUMENT ON COMPUTER NETWORK, BASED ON COMMENTS ON ELECTRONIC DOCUMENT INCLUDED IN ANOTHER ELECTRONIC DOCUMENT ASSOCIATED WITH FORMER ELECTRONIC DOCUMENT

(75) Inventors: Akiko Murakami, Kawasaki (JP); Fusashi Nakamura, Tokyo (JP); Tetsuya Nasukawa, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 12/016,381

(22) Filed: Jan. 18, 2008

(65) Prior Publication Data
US 2008/0109419 A1 May 8, 2008

(30) Foreign Application Priority Data
Jan. 22, 2007 (JP) ................................ 2007-011633

(51) Int. Cl.
G06F 17/30 (2006.01)
(52) U.S. Cl. ....................................... 707/729; 707/730
(58) Field of Classification Search .................. 707/729, 707/730; 704/4, 9
See application file for complete search history.

(56) References Cited

U.S. PATENT DOCUMENTS
2006/0112036 A1* 5/2006 Zhang et al. ................... 706/20

FOREIGN PATENT DOCUMENTS
| JP | 2002-288206 | 10/2002 |
| JP | 2003288351 | 10/2003 |
| JP | 2006202253 | 8/2006 |
| JP | 2007-11633 | 1/2007 |

OTHER PUBLICATIONS

Agrawal et al., "Mining newsgroups using networks arising from social behavior", Proceedings of the 12th international conference on World Wide Web [online], May 20, 2003, P-529-535. Retrieved from the Internet<URL:http://portal.acm.org/ft_gateway.cfm?id=775227&type=pdf&coll=GUIDE&dl=GUIDE&CFID=107538576&CFTOKEN=52846130>.*
L. Page, "The PageRank Citation Ranking: Bringing Order to the Web", Stanford Digital Libraty Technologies Project, 1998.
N. Matsumura, "Influence Diffusion Model in Text-Based Communication," Journal of the Japanese Society for Artificial Intelligence (2002), No. 3 vol. 17 SP-B, pp. 259-267.

(Continued)

Primary Examiner — John E Breene
Assistant Examiner — Dennis Myint
(74) Attorney, Agent, or Firm — Shimokaji & Associates, P.C.

(57) ABSTRACT

A computer program, method and computer apparatus for calculating the total importance of an electronic document on the basis of (i) a plurality of electronic documents chained to each other in a relation of referencing and being referenced, from a start electronic document which is not referenced by other electronic documents to a terminal electronic document which does not reference other documents, (ii) the information on relation of referencing and being referenced, (iii) an important phrase, and (iv) a response coefficient determining phrase such as an agreeing phrase, a disagreeing phrase, and a topic change phrase, (i) through (iv) being stored in a storage device.

20 Claims, 7 Drawing Sheets

OTHER PUBLICATIONS

M. Yutaka "Mining and Summarizing Conversation Data on Electrical Message Boards," the 16th Annual Convention of the Japanese Society for Artificial Intelligence (2002).

H. Tomobe, "Discussion Mining: Knowledge Discovery from Sets of Minutes", 67th Annual Convention of the Information Processing Society of Japan (2005).

"Instantaneous Analysis of 'Reputation' on Web site", IBM Japan Ltd., Jul. 26, 2004.

Shiomi Onho et al., "WWW Retrieval Based on the Degree of Reference Importance", Information Processing Society of Japan, Jan. 27, 2000, IPSJ SIG Notes vol. 2000, No. 11.

Daisuke Kitayama et al., "Extraction of Evaluation and Blog Search using News Video Scene Order" DBSJ Letters, The Database Society of Japan, Jun 28, 2005, vol. 4, No. 1 revised edition.

Takahiro Kawamura et al., "Ubiquitous Metadata Scouter—Ontology Connecting Blogs to Daily Life" Toshiba Review, Toshiba Corporation, Oct. 1, 2006, vol. 61 No. 10.

Manabu Okumura et al.,"Blog Mining—Towards Trend and Sentiment Analysis on the Web" Journal of the Japanese Society for Artificial Intelligence, Jul. 1, 2006, vol. 21 No. 4.

Naoki Kamimaeda et al., "Evaluation of Participants' Contribution in Semantic-Authoring-Based Discussion" IPSJ SIG Technical Reports, May 27, 2005, vol. 2005 No. 54.

Yutaka Matsuo et al., "Mining and Summarizing Conversational Data on Electrical Message Boards" The 16th Annual Conference of Japanese Society for Artificial Intelligence. 2002.

* cited by examiner

| MESSAGE ID | REFERENCE SOURCE | REFERENCE DESTINATION | POINTER TO CONTENTS |
|---|---|---|---|
| 1 | 2, 3 | NULL | ● |
| 2 | 4, 5 | 1 | ● |
| 3 | 6, 7, 8 | 1 | ● |
| 4 | 9 | 2 | ● |
| 5 | 9 | 2 | ● |
| 6 | NULL | 3 | ● |
| 7 | NULL | 3 | ● |
| 8 | NULL | 3 | ● |
| 9 | NULL | 4, 5 | ● |

| PARAMETERS | POINTS | EXPRESSION TYPES | EXPRESSION EXAMPLES |
|---|---|---|---|
| S | +2 | Suggestion | "IBMer should do", "We have to" |
| R | +2 | Applause | "That's a good idea!", "Nice idea!" |
| R | +1 | Agreement | "Totally agree.", "I can't agree any more!" |
| R | -1 | Disagreement | "I disagree.", "I don't agree with you." |
| R | 0 | New topic | "Let's change the subject...", "Let's talk about something else..." |
| S, R | S: +1 R: -0.5 | Question | "What types do you...?", "How we can get...?" |
| S, R | S: +0.5 R: -0.5 | Fact Indication | "http://...", "already have" |

COMPUTER APPARATUS, COMPUTER PROGRAM AND METHOD, FOR CALCULATING IMPORTANCE OF ELECTRONIC DOCUMENT ON COMPUTER NETWORK, BASED ON COMMENTS ON ELECTRONIC DOCUMENT INCLUDED IN ANOTHER ELECTRONIC DOCUMENT ASSOCIATED WITH FORMER ELECTRONIC DOCUMENT

CROSS REFERENCE TO RELATED APPLICATIONS

This application claims the benefit of Japanese Patent Application No. JP2007-11633 filed Jan. 22, 2006, the contents of which are hereby incorporated by reference.

BACKGROUND OF THE INVENTION

The present invention relates to a computer apparatus, a computer program and a method, the three of which are for calculating the importance of an electronic document on a computer network, and particularly relates to a computer apparatus, a computer program and a method, the three of which are for calculating the importance of a first electronic document based on comments on the first electronic document included in a second document which is associated with the first electronic document targeted for calculating the importance.

Various techniques have been developed for finding something interesting to a network user with a high degree of accuracy in a short time from among a large number of electronic documents included in discussion threads, web pages, blogs and the like, which are scattered on the network. An electronic document which agrees with the interests of the user is highly important to him/her.

As one of techniques for automatically judging the importance of a web page on the computer network, PageRank of Google is well-known. The details are described in Lawrence Page, Sergey Brin, Rajeev Motwani, Terry Winograd, "The PageRank Citation Ranking: Bringing Order to the Web", 1998.

In short, PageRank is a technique for judging the importance of a group of web pages on the network on the basis of the recursive relation where a web page linked from a larger number of higher-quality web pages is also a higher-quality web page. Specifically, computing the importance of a certain web page is based on the number of links from other web pages to the certain web page, the existence of a link to the certain web page provided by a highly recommended web page, and the number of links on a page having a link to the certain web page.

In other words, PageRank is a technique for calculating the relative importance of each web page by use of links between web pages.

PageRank does not provide functions to analyze the contents of a first web page, and to calculate the importance of a second web page based on comments on the second web page included in the contents of the first web page.

Additionally, in recent years, attempts have been made to analyze web postings and discussions in consumer-generated media such as a social networking service or a blog, to specify potential needs and senses of values of consumers, and to make use of the specified needs and the like for developing a new product and marketing.

"Influence Diffusion Model in Text-Based Communication," Journal of the Japanese Society for Artificial Intelligence (2002), no. 3 vol. 17 SP-B, pp. 259-267, discloses a method for measuring to what degree a specific comment on an electronic bulletin board is quoted in the following replies to the comment by text analysis, and thereby for calculating the degree of influence of the specific comment over other comments.

"Mining and Summarizing Conversation Data on Electrical Message Boards," the 16th Annual Convention of the Japanese Society for Artificial Intelligence (2002), discloses a method for calculating, for each posting on an electronic bulletin board, the importance of a posting based on three indexes of (1) how much the contents of a current posting is related to a topic in a previous posting to which the current posting is made for a reply, (2) how many new words are used, (3) how many postings exist after a topic is provided as new information in a posting until the topic is cited as old information in a later posting.

However, these documents do not describe a method for analyzing comments on the contents of another posting included in the contents of each posting, for example, agreeing or disagreeing comments, and thereby for determining the importance of the contents of each posting.

Hironori Tomobe and Katashi Nagao (2005), "Discussion Mining: *gijiroku shuugou karano chishiki hakken* (Discussion Mining: Knowledge Discovery from Sets of Minutes)," the 67th Annual Convention of the Information Processing Society of Japan, discloses a method of calculating the importance of a remark by use of active propagation, based on a notion that a remark linked from an important remark and a remark linked to an important remark in a collection of minutes are important.

In other words, the document discloses a method of analyzing minutes from the aspect of a network configuration, which does not include analyzing the contents of each remark to thereby calculate the importance of each remark.

A reputation analysis solution disclosed in IBM Japan Ltd., Jul. 26, 2004, *"Homepagejyono hyouban wo shunjini bunseki* (Instantaneous Analysis of 'Reputation' on Web site)," relates to a technique of instantaneously classifying customers' comments sent to a company into a "favorable" one and an "unfavorable" one by applying IBM (registered trademark) TAKMI (Text Analysis and Knowledge Mining).

However, this technique does not include calculating the importance of each message included in a discussion thread on a network. Therefore, no method is disclosed or suggested, for calculating the importance of a certain message by use of an analysis of the contents of another thread responding to the certain message.

As described above, according to the conventional techniques, it is not possible to analyze the contents of each message in a chain of messages responding to the previously posted messages such as a discussion thread on a computer network, and to automatically determine the importance of each message on the basis of a comment on the message included in another message, for example, whether the comment is critical (a negative one) or is agreeing (a positive one), and the like.

SUMMARY OF THE INVENTION

In one aspect of the present invention, a computer program product comprising a computer useable medium including a computer readable program, wherein the computer readable program when executed on a computer causes the computer to function as a system for calculating the total importance of each of electronic documents, based on (i) a plurality of electronic documents chained to each other in a relation of referencing and being referenced, from a start electronic document which is not referenced by any other electronic document to a terminal electronic document which does not reference any other document, (ii) information on relation of referencing and being referenced, (iii) an important phrase, and (iv) a response coefficient determining phrase, (i) through (iv) being stored in a storage device, comprises a search phrase document importance calculator for calculating the importance of a given electronic document among the plurality of electronic documents, on the basis of the degree of similarity between the important phrase and a phrase included in the given electronic document; a referencing document identifier for identifying at least one second electronic document which references the given electronic document, on the basis of the information on relation of referencing and being referenced; a response coefficient calculator for calculating a response coefficient against the first electronic document, on the basis of the degree of similarity between a phrase included in the second electronic document and the response coefficient determining phrase; a document pair importance calculator for calculating the total importance of the given electronic document, based on the own importance of the given electronic document, and the total importance of the second electronic document; and a total document importance calculator for calculating the total importance of each of the plurality of electronic documents, the means applying the preceding components to each pair of the plurality of electronic documents.

In another aspect of the present invention, a method for calculating the importance of at least one of a plurality of electronic documents, based on (i) a plurality of electronic documents, (ii) information on referencing relation between each pair of the electronic documents, (iii) an important phrase, and (iv) a response coefficient determining phrase, (i) through (iv) being stored in a storage device, the method comprises the steps of calculating the own importance of a given electronic document among the plurality of electronic documents, on the basis of the degree of similarity between the important phrase and a phrase included in the given electronic document, identifying at least one of other electronic documents which references the given electronic document, on the basis of the reference information, calculating a response coefficient against the given electronic document, on the basis of at least one of the degrees of similarities between a phrase included in the other electronic documents and the response coefficient determining phrase, calculating the total importance of the given electronic document, on the basis of the own importance of the given electronic document, the response coefficient, and the total importance of the other electronic documents, and calculating the total importance of each of the electronic documents in an electronic document group in which the given electronic document and the other electronic documents are directly and indirectly linked to each other on the basis of the reference information through relations of referencing and being referenced, by applying the preceding components to each pair of electronic documents having a mutual relation of directly referencing and being referenced in the electronic document group.

In another aspect of the present invention, a computer apparatus for calculating the importance of at least one of a plurality of electronic documents, based on (i) the plurality of electronic documents, (ii) reference information between each of the electronic documents, (iii) an important phrase, and (iv) a response coefficient determining phrase, (i) through (iv) being stored in a storage device, the computer apparatus comprises a search phrase document importance calculator for calculating the own importance of a given electronic document among the plurality of electronic documents, based on the degree of similarity between the important phrase and a phrase included in the given electronic document; a referencing document identifier unit for identifying at least one of other electronic documents which references the given electronic document, on the basis of the reference information; a response coefficient calculator for calculating a response coefficient against the given electronic document, on the basis of at least one of the degrees of similarities between a phrase included in the other electronic documents and the response coefficient determining phrase; a document pair importance calculator for calculating the total importance of the given electronic document, on the basis of the own importance of the given electronic document, the response coefficient, and the total importance of the other electronic documents; and a total document importance calculator for calculating total importance of each of the electronic documents in an electronic document group in which the given electronic document and the other electronic documents are directly or indirectly linked to each other on the basis of the reference information, through relations of referencing and being referenced, by recursively applying the components (a) to (d) to each pair of electronic documents in a mutual relation of directly referencing and being referenced in the electronic document group.

In another aspect of the present invention, a computer program product comprising a computer useable medium including a computer readable program, wherein the computer readable program when executed on a computer causes the computer to function as a system for calculating the total importance of each of a plurality of electronic documents on the basis of: a plurality of electronic documents, chained to each other in a relation of referencing and being referenced from a start electronic document which is not referenced by any other electronic document to a terminal electronic document which does not reference any other document; an important phrase; and a response coefficient determining phrase, all of which are stored in a storage device, the computer program causing a computer to operate as a start electronic document importance calculator for calculating the total importance of the start electronic document, on the basis of the degree of similarity between the important phrase and a phrase included in the start electronic document; and a total document importance calculator for calculating the total importance of each of the plurality of electronic documents having a relation of referencing and being referenced in the chain of the electronic documents, by sequentially applying an equation $c_i = s_i + a \times r_{ij} \times c_j$ to pairs of electronic documents, in a direction from a pair of the start electronic document and another electronic document that the start electronic document references to the terminal electronic document, where $c_i$ is the total importance of an i-th electronic document in the chain of the electronic documents, $s_i$ is the own importance of the i-th electronic document, and is calculated on the basis of the degree of similarity between a phrase included in the i-th electronic document and the important phrase, a is a number which satisfies $0<a<1$, $r_{ij}$ is a response coefficient which is calculated on the basis of the degree of similarity between a phrase included in the j-th electronic document and the response coefficient determining phrase, wherein j-th electronic document directly references and is a response to the i-th electronic document, and $c_j$ is the total importance of the j-th electronic document.

In another aspect of the present invention, a computer program for calculating the total importance of each of electronic documents, on the basis of (i) a plurality of electronic documents, chained to each other in a relation of referencing and being referenced, from a start electronic document which is not referenced by any other electronic document to a terminal electronic document which does not reference any other document, (ii) information on relation of referencing and being referenced, (iii) a first phrase, and (iv) a second phrase, (i) through (iv) being stored in a storage device, the computer program causing a computer to operate as a search phrase document importance for calculating the own importance of a given electronic document among the plurality of electronic documents, on the basis of the degree of similarity between the first phrase and a phrase included in the given electronic document; a referencing document identifier for identifying at least one second document which references the given electronic document, on the basis of the information on relation of referencing and being referenced; a response coefficient calculator for calculating a response coefficient against the first electronic document, on the basis of the degree of similarity between a phrase included in the second electronic document and the second phrase; a document pair importance calculator for calculating the total importance of the given electronic document, on the basis of the own importance of the given electronic document and total importance of the second electronic document; and a total document importance calculator for calculating the total importance of each of the plurality of electronic documents, by applying the preceding components to each pair of the plurality of electronic documents.

These and other features, aspects and advantages of the present invention will become better understood with reference to the following drawings, description and claims.

BRIEF DESCRIPTION OF THE DRAWINGS

For a more complete understanding of the present invention and the advantage thereof, reference is now made to the following description taken in conjunction with the accompanying drawings.

FIG. 3 is a data configuration example of the discussion graph according to the present invention.

FIG. 4 is an example of opinion expressions stored in an opinion expression storage 202 according to the present invention.

DETAILED DESCRIPTION OF THE PREFERRED EMBODIMENT

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention relates to a computer apparatus, a computer program and a method each for calculating the importance of an electronic document on a computer network, and more particularly relates to calculating the importance of a first electronic document based on comments on the first electronic document included in a second document which is associated with the first electronic document. Calculating the importance of an electronic document is useful in the fields of search engine development, search-based services (include Internet-based services and Web sites) and context-sensitive advertising.

In contrast to the prior art, the present invention makes it possible to analyze the contents of each message in a chain of messages responding to the previously posted messages, such as a discussion thread on a computer network, and to automatically determine the importance of each message on the basis of a comment on the message included in another message, for example, whether the comment is critical (a negative one) or is agreeing (a positive one), and the like.

Figure 1:
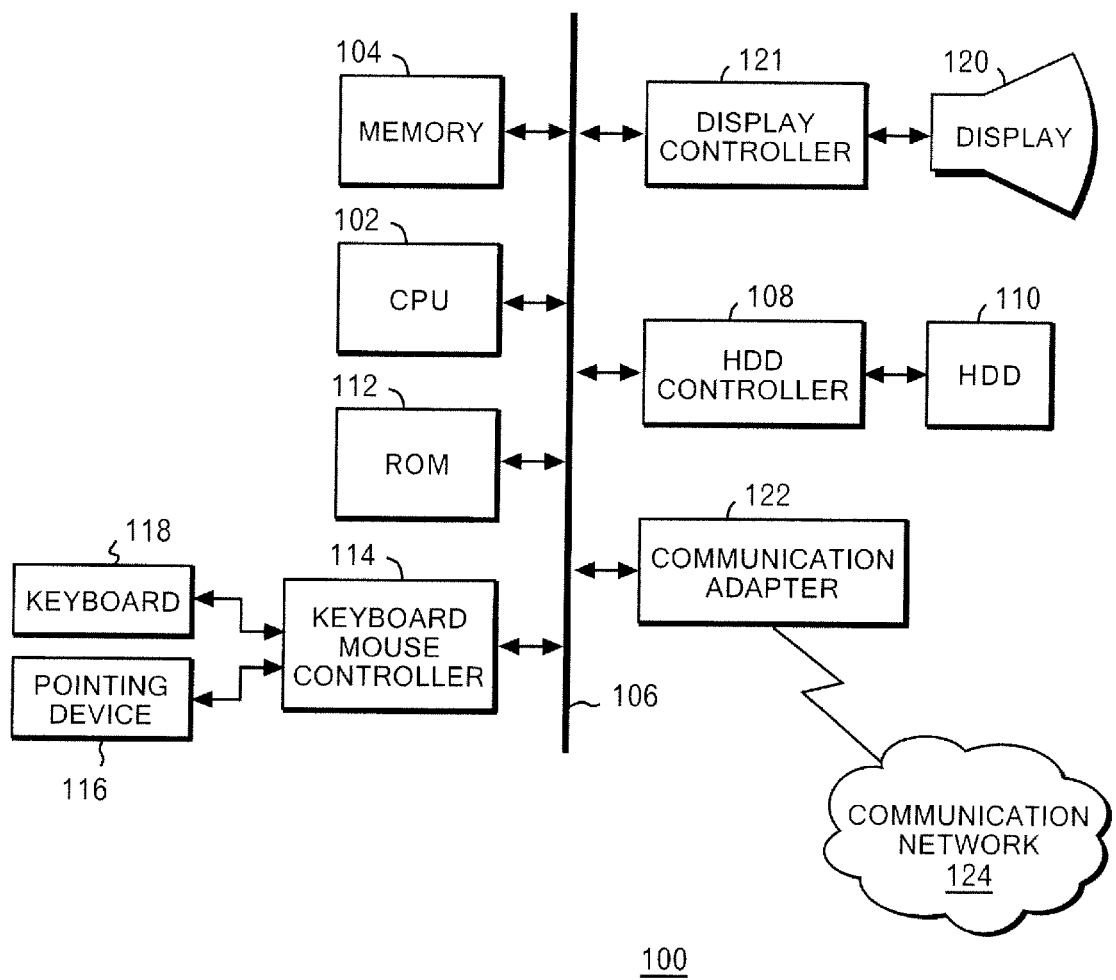
FIG. 1 is a schematic diagram of a hardware configuration for implementing a computer apparatus 100 according to the present invention.

FIG. 1 is a schematic diagram of a hardware configuration for implementing a computer apparatus 100 of the present invention. The computer apparatus 100 includes a central processing unit (CPU) 102 and a memory 104. The CPU 102 and the memory 104 are connected to a hard disk device 110 as an auxiliary storage device via a bus 106 and a hard disk controller 108.

The codes of a computer program for implementing the present invention and various data can be stored in a recording medium such as the hard disk device 110 or a ROM 112 by giving a command to the CPU 102 and the like in cooperation with an operating system.

The codes of the computer program are executed by being loaded to the memory 104. The codes of the computer program can be stored by being divided into several segments and can be stored in a plurality of recording media. Alternatively, it is also possible to store a part of the codes divided into several segments in a recording medium in another information processor connected to the computer apparatus 100 via a network 124, and to cause the divided codes to cooperate with each other. The scheme of distributing the divided codes to a plurality of devices and causing the divided codes to cooperate is embodied as a client server system, for example. Causing each device to execute which code and whether to execute each of the functions are matters which can be appropriately selected upon system design, and the present invention includes all of the modes.

The computer apparatus 100 further includes user interface hardware. As the user interface hardware, there are a pointing device (a mouse, a joy stick, a touch pad, or the like) 116, a keyboard 118 for supporting key entry, and a display 120 for presenting a user with a documentary image targeted for edition, for example.

The computer apparatus 100 according to the present invention can communicate with other computers via a communication adapter 122.

The above hardware configuration can be embodied as any kinds of information processors such as a personal computer, a workstation, a business machine, a household electrical appliance, a mobile phone, and on-board equipment. However, each of the above constituent elements is an example, and not all of the constituent elements are essential to the present invention.

One which supports a graphic user interface multi-window environment as standard, such as Windows XP (R), AIX (R), and Linux (R) is favorable as the operating system. However, other operating systems may be adopted, and the present invention is not limited to a specific operating system environment.

Before explaining the details of the system configuration of the present invention, terms will be defined.

Thread: a thread generally indicates a series of "certain objects", and a discussion is a set of a plurality of messages (or opinions) on a certain subject. A discussion thread is one in which all the messages are chained, and which includes branches, with respect to response relations between the messages.

A message specifically indicates a posted article, a response to the article and the like in a social networking service such as a blog and an electronic bulletin board. A typical message includes information such as text and an image, and reference information to other messages. For example, a message having an ID number 2, which has been posted for the purpose of replying to a message having an ID number 1, includes the ID number 1 in addition to the information such as text and an image. Alternatively, the message having the ID number 1 may include the ID of the other message which references the message having the ID number 1, that is, the ID 2. There is naturally a case where a reference relation between messages is stored as reference relation information which is independent from the message.

Although a discussion thread is shown as an example of an operation target of the computer apparatus of the present invention throughout the Specification, the operation target is not limited to this. In short, as long as there is a plurality of electronic contents and it is a system where a relation exists, of referencing and being referenced between the contents, any can be an operation target of the computer apparatus of the present invention. For example, it may be a network system including web pages and a Discussion graph: a graph showing messages included in a discussion thread and a relation of referencing and being referenced between the messages by use of figures representing each message and line segments joining the figures.

Figure 2:
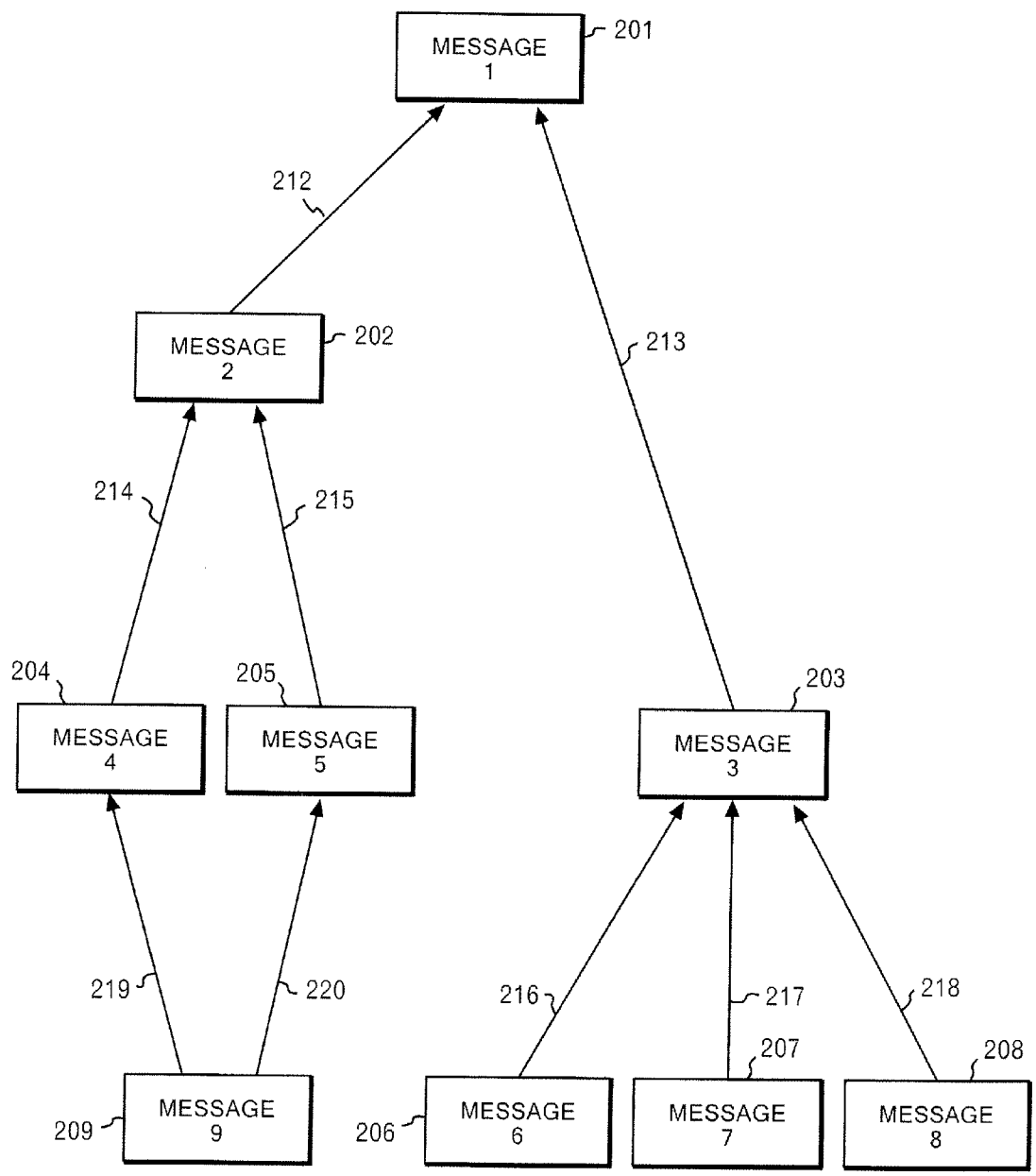
FIG. 2 is a conceptual diagram of a discussion graph according to the present invention.

FIG. 2 is an example of the discussion graph. There are two responses of messages 2 202 and 3 203 to a message 1 201. The responses are represented by line segments 212 and 213. It is preferable that these line segments are directed segments. For example, an arrow directed from the message 3 203 to the message 1 201 shows that the message 3 203 is a reply to the message 1 201. Alternatively, the arrow indicates that message 3 203 references the message 1 201.

It is obvious to those skilled in the art that a discussion graph is configured to be capable of being stored in a storage device of a computer. For example, as shown in FIG. 3, a discussion graph may be stored in the storage device in tabular form including a message ID, a referencing message, a referenced message, and a pointer to the contents of a message.

For example, the message 1 201 is referenced by both of the message 2 202 and the message 3 203, and the referencing message numbers 2 and 3 are stored. On the other hand, the message 1 201 references no message, and NULL is stored in the reference destination. Furthermore, it is preferable that a pointer to a storage area where the contents of the message 1 201 is stored is stored in the table.

Electronic document: documentary information to be stored in a computer or a network system which is capable of being transferred, copied, displayed and the like, such as a message, a web page, and an e-mail, which are constituent elements of a discussion thread, are collectively referred to as electronic documents.

Reference: a reference between electronic documents is a response to an existing message when the electronic document is a message included in a discussion thread. It can be expressed that a response message references the existing message, and that the existing message is referenced by the response message. The response message is a referencing message, and the existing message is a referenced message.

Reference information is information indicating the reference source and destination of a message as described by use of FIG. 3. When the electronic document is a web page, a reference is a link. One of pieces of reference information in this case is an address of a referenced web page included in a referencing web page. In addition, it is possible to obtain mutual reference information between the web pages using an access record of the referencing web page to the referenced web page.

Own importance: importance unique to one electronic document. The term "own" is used to be distinguished from total importance described later.

Own importance depends on: the interests of a user who uses an electronic document; and agreement on or similarity with the contents of the electronic document. It is possible to determine the own importance of an electronic document most conveniently, by use of the technique of information retrieval.

For example, it is possible to express a user's interests as retrieving conditions (words prepared beforehand as an important phrase group may be used as words to be included in the retrieving condition), to retrieve an electronic document under the retrieving conditions, and to make the importance of an electronic document including the words of the retrieving conditions higher than that of other electronic documents. It is also possible to associate the retrieved word with points, and to express the importance with the points.

Moreover, the own importance of an electronic document can be determined by a technique of text mining.

For example, a technique described in Tetsuya Nasukawa, Hiroyuki Kawano, and Hiroki Arimura (2001), "Base Technology for Text Mining", Journal of the Japanese Society for Artificial Intelligence, no. 2 vol. 16, can be used.

That is, the collection of text included in an electronic document is divided into words and phrases by use of a method of natural language analysis. Then, an electronic document which agrees with a user's interests is retrieved by use of a method of: analyzing the occurrence frequency and correlation of these words and phrases; and extracting useful information. The own importance of the electronic document is then determined in accordance with the degree of agreement.

Here, it is obvious to those skilled in the art that an appropriate corresponding relation between the results of retrieval and analysis, and the own importance can be selected whatever technique is employed. In one example of the corresponding relation, the own importance is determined by expressing, as points, the degree of agreement between a designated retrieving condition and the contents of an electronic document.

Total importance: total importance $c_i$ of an electronic document i is found by the following equation (1).

$$c_i = s_i + a\Sigma r_{ij} \Box c_j \tag{1}$$

Here, $s_i$ is the own importance of the electronic document i.

a is an attenuation factor, is preferable to be a number which satisfies 0<a<1, and will be described in detail later.

$r_{ij}$ is a response coefficient and will be described in detail later.

$c_j$ is the total importance of another document j which references the electronic document i.

Σ indicates that a product of r and c, and further, a total sum of these products are obtained for each of other electronic documents, when there are a plurality of other electronic documents j that reference the electronic document i.

Response coefficient: when a first electronic document references a second electronic document, a value of the second electronic document, which is determined in accordance with the contents of the first electronic document, is referred to as a response coefficient.

Preferably, a response coefficient indicates a positive value in a case of agreeing contents, and indicates a negative value in the case of critical contents. Further, a response coefficient indicates a large positive value in a case of contents of active approval, and a small positive value in the case of contents of passive approval.

Here, the degree of being "agreeing" or "critical" is determined by use of opinion expressions described as follows.

Opinion expression: a phrase included in an electronic document that expresses an opinion, that is, the way of thinking, feelings, or an argument. For example, the opinion expression includes "approval", "disapproval", "question", "pointing out that it has already been stated", or the like.

An opinion expression has two effects. The first effect of an opinion expression is to determine the importance of an electronic document that includes an opinion expression.

For example, an electronic document including phrases which indicate a specific solution such as "should do~" has a high importance to a user who is searching for a solution. Meanwhile, an electronic document including phrases that indicate a reference to other information such as "please refer to~", similarly has a high importance to a user who is considering various solutions.

The second effect of the opinion expression is to determine the importance of a second electronic document that the electronic document including the opinion expression references.

For example, phrases indicating agreement or disagreement such as "I agree" and "I cannot agree" have influence on the importance of the referenced second electronic document. For example, the importance of a message which is referenced (is responded) by a message including agreeing phrases is highly important.

Generally speaking, positive phrases increase the importance of the referenced second electronic document, and negative phrases decrease the importance of the referenced electronic document.

Meanwhile, phrases indicating questions such as "why" and "how" too, have influences on the importance of the referenced second electronic document.

A message responded from a message which has a phrase indicating a question can be considered that the question casts doubt on the reliability of the message, and the importance of the message becomes low.

At the same time, the opinion expression of a question has the above first effect that a message itself including the phrase indicating the question becomes more important by checking the contents of the referenced message.

FIG. 4 shows an opinion expression table summarizing the above.

The table is configured of parameters influenced by opinion expressions, degrees of adjustments for the parameters, expression types, and expression examples. For example, expression examples of "IBMer should do" and "We have to" are an expression type categorized as a Suggestion, and a own importance s of an electronic document itself which includes these phrases or phrases similar to these is higher than that of an electronic element which does not include these phrases. In this example, +2 points which are added to s are assigned to these expressions. In other words, these are an important phrase group.

When an electronic document includes expression types of Applause, Agreement, and Disagreement, the electronic document has influence on the importance of other electronic documents referenced by the electronic document. Therefore, each of the points which are added to r is assigned to these expressions. The first two are of an agreeing phrase group and phrases belonging to the expression type of Disagreement are of a disagreeing phrase group.

For example, when an expression example of the expression type of Disagreement is included in the electronic document, it can be understood that the importance of an electronic document which is referenced by the electronic document including the Disagreement expression is decreased by the equation (1).

An expression example indicating a change in topics (New topic) is considered to have no influence on the importance of the referenced electronic document. Accordingly, points are not added to r.

Phrases belonging to this expression type are of a topic change phrase group.

Phrases belonging to expression types of a Question and Fact Indication are considered to have influence on both of the importance of an electronic document itself including these phrases and the importance of other documents referenced by the electronic document, and additional points are therefore assigned to both of s and r.

In short, while phrases belonging to these expression types are of the important phrase group, the phrases also belong to the agreeing or disagreeing group.

Note that the above is an example, and that expression examples, expression types, and points can appropriately be changed in accordance with an application of the present invention.

In short, it is sufficient as long as expression types, expression examples belonging to the expression types, corresponding addition and subtraction points, and parameters to be added and subtracted are associated.

Additionally, in the comparison of an expression example and the contents of an electronic document, similarity and agreement can be determined by use of a conventional text analysis method. In the following descriptions, those skilled in the art can understand that although it is referred to as "Agreement" for simplification, similarity, too, can be included therein.

Attenuation factor: as described in the above paragraph of total importance, it is preferable that the attenuation factor is a positive small number. The reason is as follows: an attenuation factor a is multiplied by the product of the total importance $c_j$ and $r_{ij}$ of the referencing electronic document. In addition, the total importance of the referenced electronic document depends on $ar_{ij}c_j$. When there is an electronic document k which further references the referencing electronic document j, the total importance of the electronic document j is found by the equation (1) to be $c_j = s_j + \Sigma ar_{jk}c_k$.

$c_i = s_i + \Sigma a\ r_{ij}c = s_i + \Sigma a\ r_{ij}c_j + \Sigma\Sigma a^2 r_{ij}r_{jk}c_k$ is derived from the relation above describing $c_j$ and $c_i = s_i + \Sigma ar_{ij}c_\square$.

Here, focusing on the facts that $c_j$ is multiplied by a and that $c_k$ is multiplied by $a^2$, the total importance of the electronic document j which directly references the electronic document i contributes more to the total importance of the electronic document i, and the total importance of the electronic document k which indirectly references the electronic document i contributes less to the total importance of the electronic document i.

Similar to a discussion thread, in a system where each message is mutually chained through a reference relation, it is made possible to execute the processing which agrees with a rule of thumb that "the farther message has smaller influence on the importance of a message" by introducing an attenuation factor to the calculation of the total importance of each message.

Next, descriptions will be given of the system configuration of the present invention with reference to FIG. 5.

Figure 5:
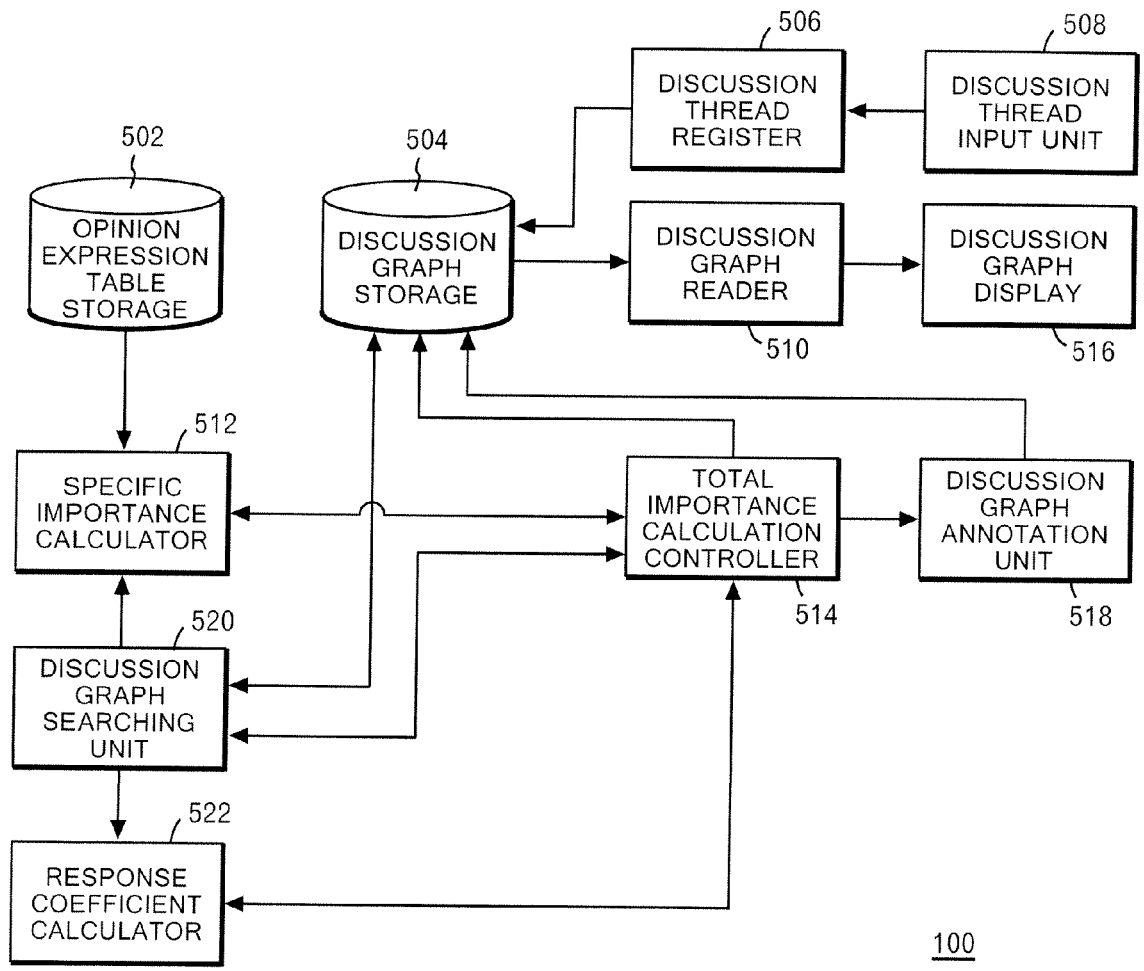
FIG. 5 is a functional block diagram of the computer apparatus 100 according to the present invention.

A functional block shown in FIG. 5 is a logical functional block, and does not necessarily mean that the present invention is implemented by hardware and software, each of which is integrated into one. Each functional block can be embodied by individually independent hardware or cooperation of hardware, or common hardware or software.

In the embodiment of the present invention, the computer apparatus includes an opinion expression table storage 502, a discussion graph storage 504, a discussion thread register 506, a discussion thread input unit 508, a discussion graph reader 510, a discussion graph display 516, a total importance calculation controller 514, an own importance calculator 512, a discussion graph annotation unit 518, a discussion graph searching unit 520, and a response coefficient calculator 522.

The discussion thread input unit 508 accepts the input of a message in response to an input by a user from the keyboard 118 and the like. A user typically inputs text being the contents of a message, and also inputs reference information that the inputted message is a response to which message among other messages when necessary. Such an input operation is well-known, and is typically message posting to an electronic bulletin board and a response posting to another posted message.

The discussion thread register 506 adds the message inputted by the user to a discussion graph stored in the discussion graph storage 504. Addition means to additionally write, in the table illustrated in FIG. 3, the ID of the inputted message, a pointer to the text, and information on a reference source and a reference destination. The information on the reference source and the reference destination is generated according to reference information inputted by the user, and is stored.

The discussion graph storage 504 stores a discussion graph including existing messages. A discussion graph is conceptually shown in FIG. 2, and is represented as a data format illustrated in FIG. 3, as have already been described.

The discussion graph reader 510 reads the discussion graph in the discussion graph storage 504. To read means searching for the data illustrated in FIG. 3, and restoring the contents of the message from the discussion graph storage 504. The restored message is transmitted to the discussion graph display 516. At the same time, the discussion graph reader 510 also reads the reference relation of the messages from the discussion graph storage 504, and transmits the reference relation to the discussion graph display 516.

The discussion graph display 516 displays the contents of the message received from the discussion graph reader 510 according to the reference relation of the messages.

The functions of the discussion thread input unit 508, the discussion thread register 506, the discussion graph reader 510, and the discussion graph display 516 are typically implemented by e-mail management software, groupware and the like.

By these kinds of software, the discussion graph is formed in the discussion graph storage 504, and is updated in accordance with the user's operations of registering and deleting a message.

These kinds of software may be a part of the computer apparatus according to the present invention, or may be an independent one.

The opinion expression table storage 502 stores the above-mentioned opinion expression table (FIG. 4). It is also possible that the user generates the opinion expression table beforehand and that the opinion expression table is stored in the opinion expression table storage 502.

The total importance calculation controller 514 calculates the total importance of each message included in the discussion graph on the basis of the above-mentioned equation (1), and transmits the result to the discussion graph annotation unit 518. The total importance calculation control will be described in detail later.

The discussion graph annotation unit 518 adds the total importance of the message and the like, which have been received from the total importance calculation controller 514, to the discussion graph.

Specifically, they are stored in the discussion graph storage 504 by associating the message with the total importance thereof such that the discussion graph reader 510 and the discussion graph searching unit 520 can read them.

The discussion graph searching unit 520 responds to a request from the total importance calculation controller 514, searches for and reads the contents of a message which should be processed by each of the other units in the discussion graph storage 504, and transmits the contents to a designated unit.

The own importance calculator 512 calculates the own importance of the message according to the contents of the message received from the discussion graph searching unit 520.

For example, phrases included in the read text are compared with the expression examples in the opinion expression table (400 in FIG. 4), and points to be added to the own importance s is determined on the basis of the degree of agreement. For example, when there is a phrase which greatly agrees with the expression example of "IBMer should do" in the text, two points are added to the own importance s of the message (the initial value of s may be set to 0).

The calculation result is transmitted to the total importance calculation controller 514.

The response coefficient calculator 522 references the opinion expression table, and calculates a response coefficient r of the message, according to the contents of the message received from the discussion graph searching unit 520.

The calculation result is transmitted to the total importance calculation controller 514.

Next, detailed descriptions will be given of the procedure for calculating the total importance of each message.

The following is a summary of the operations. In short, as can be understood from the equation (1), the total importance of an arbitrary message can be determined by use of the total importance of other messages which reference the message and the contents of the other messages. Therefore, the total importance calculation controller 514 sequentially calculates the total importance of each message while sequentially changing the pair of messages which have a relation of referencing and being referenced.

As can be understood from the equation (1), it is preferable that the total importance of a first message which is not referenced by any other messages is calculated first. By doing so, the total importance of a second message which is referenced by the referenced by the second message is further determined by use of the total importance of the second message. In this manner, it is made possible to consistently calculate the total importance of each message throughout the discussion graph.

For example, in the discussion graph shown in FIG. 3, the total importance of messages 6, 7, 8, and 9 are calculated first, and afterwards, the total importance of messages 3, 4, and 5 are calculated by use of the calculation results. Furthermore, the total importance of a message 2 is calculated, and lastly, the total importance of a message 1 (a terminal) is calculated. The above procedure is preferable.

Procedure for determining the total importance of each message, which will be described in detail below, is an example, and the procedure is not limited to this. Division into a plurality of tasks of a series of processes and synchronization between the tasks can appropriately be selected by those skilled in the art.

As can be understood from the equation (1), the total importance of an arbitrary message i depends on the contents of another message j which references the message i.

The procedure for calculating the total importance of the message i will be described in detail below by use of the pair of arbitrary messages i and j.

Note that the total importance calculation controller 514 separately executes a task to identify the pairs of messages targeted to apply the following procedure. Specifically, the task firstly identifies the start messages (the messages 6 to 9 in FIG. 3) via the discussion graph searching unit 520, and generates a total importance calculation task of executing the following procedure for the pairs of messages including these starts.

Furthermore, it is preferable that a total importance calculation task is generated for other pairs of messages in the sequential order previously described.

When each task is completed, the calculation of total importance for each message is completed.

Figure 6:
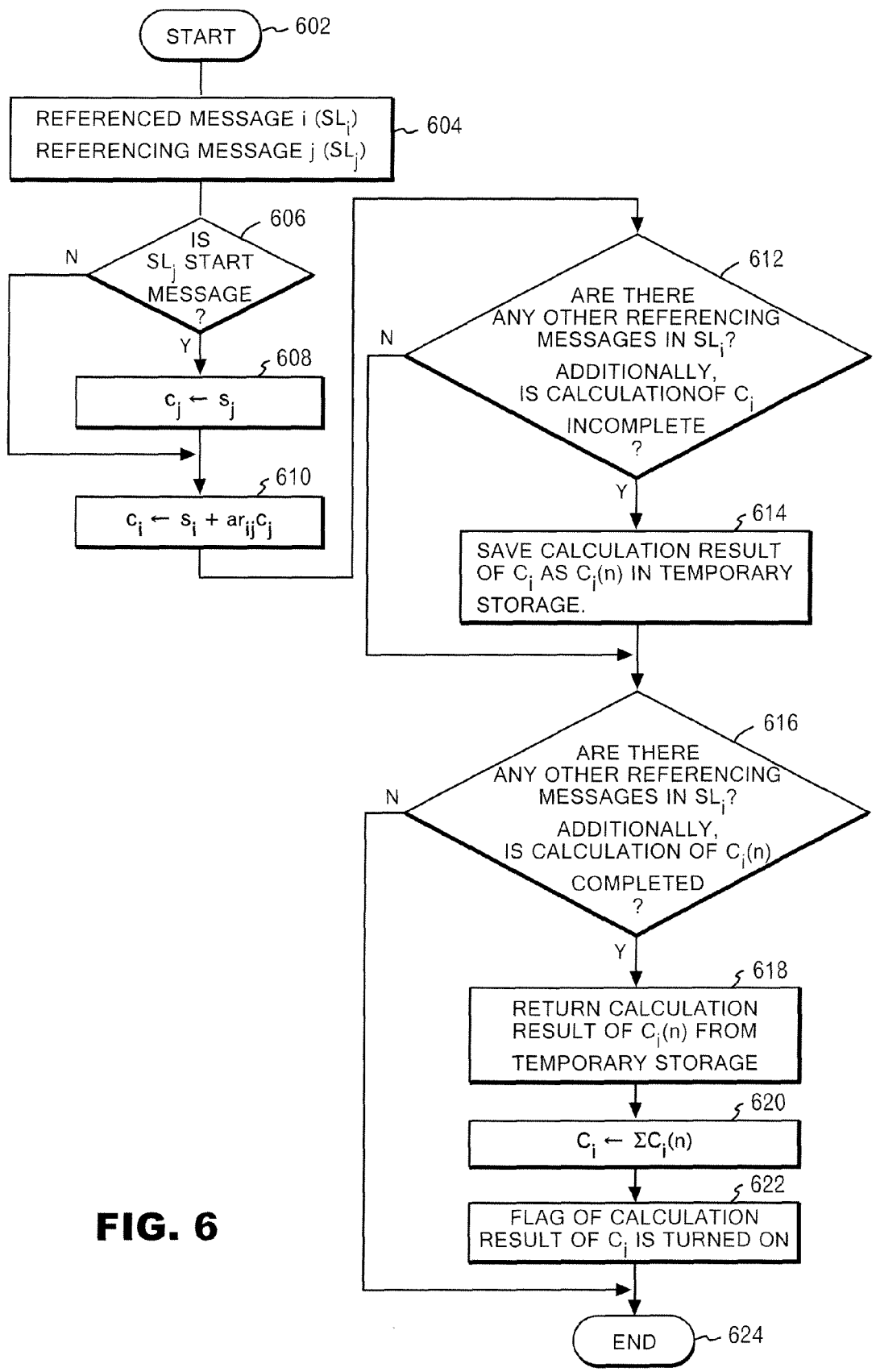
FIG. 6 is a processing flow chart for calculating total importance by the computer apparatus 100 according to the present invention.

FIG. 6 shows the procedure for processing a total importance calculation task, that is, the procedure for calculating the total importance of the message i by use of the pair of arbitrary messages i and j.

Unless otherwise noted hereinafter, the main unit to execute each process is the total importance calculation controller 514.

In addition, the total importance calculation controller 514 obtains the contents of a message, which is necessary for each process, from the discussion graph storage 504 via the discussion graph searching unit 520. However, this step is omitted in the descriptions in order to avoid complication.

Firstly, pairs of messages targeted for processing are identified by another task for identifying the above pair of messages, and a total importance calculation task is generated (Step 602).

The IDs of the referenced message i and the referencing message j are received from the other task (Step 604).

When the reference source j is a start message, in other words, when there is no other message that references the referencing message j (Step 606), the own importance $s_j$ of the referencing message j is substituted in the total importance of the referencing message j (Step 608).

The own importance calculator 512 calculates the own importance.

Next, the response coefficient calculator 522 calculates a response coefficient $r_{ij}$, and the total importance of the referencing message i is calculated on the basis of the equation (1) by use of the calculated $s_i$, $r_{ij}$, and $c_\square$ (Step 610).

Next, the existence of another referencing message which references the referenced message i is searched for, through the discussion graph searching unit 520. When other referencing messages exist, and when the calculation of $c_i$ by use of the pair of these referencing messages and the referenced message i is incomplete, $c_i$ determined in Step 610 is temporarily saved as $c_i(n)$ (Step 612, 614). n is for convenience in distinguishing each contribution to final $c_i$, where the contribution is determined by use of an individual pair of the common referenced message i and any message referencing the message i.

This processing is for determining the total importance of a message referenced by a plurality of messages, similar to the message 3 shown in FIG. 3, by the sum ($c_{36}$, $c_{37}$, and $c_{38}$) of a plurality of total importance.

If all the calculations of $c_i(n)$ on the pair of the other referencing messages and the referenced message i are complete (Step 616), the temporarily saved $c_i(n)$ is returned from a temporary storage (Step 618), these are added (Step 620), and the total importance of the referenced message i is determined (Step 620).

Next, a flag showing that the total importance calculation of the referenced message i has completed is turned ON (Step 622).

This flag is provided for the time when the other task for identifying the pair of messages identifies a new pair. In other words, when the flag is ON, the message i is no longer designated as a referenced message.

A flag and total importance are stored in the discussion graph storage 504 via the discussion graph annotation unit 518.

In a case where not all the calculations of $c_i(n)$ are completed (Step 616), the task is terminated (Step 624). The remaining calculations of $c_i(n)$ are performed by other total importance calculation tasks.

E EXAMPLE

Figure 7:
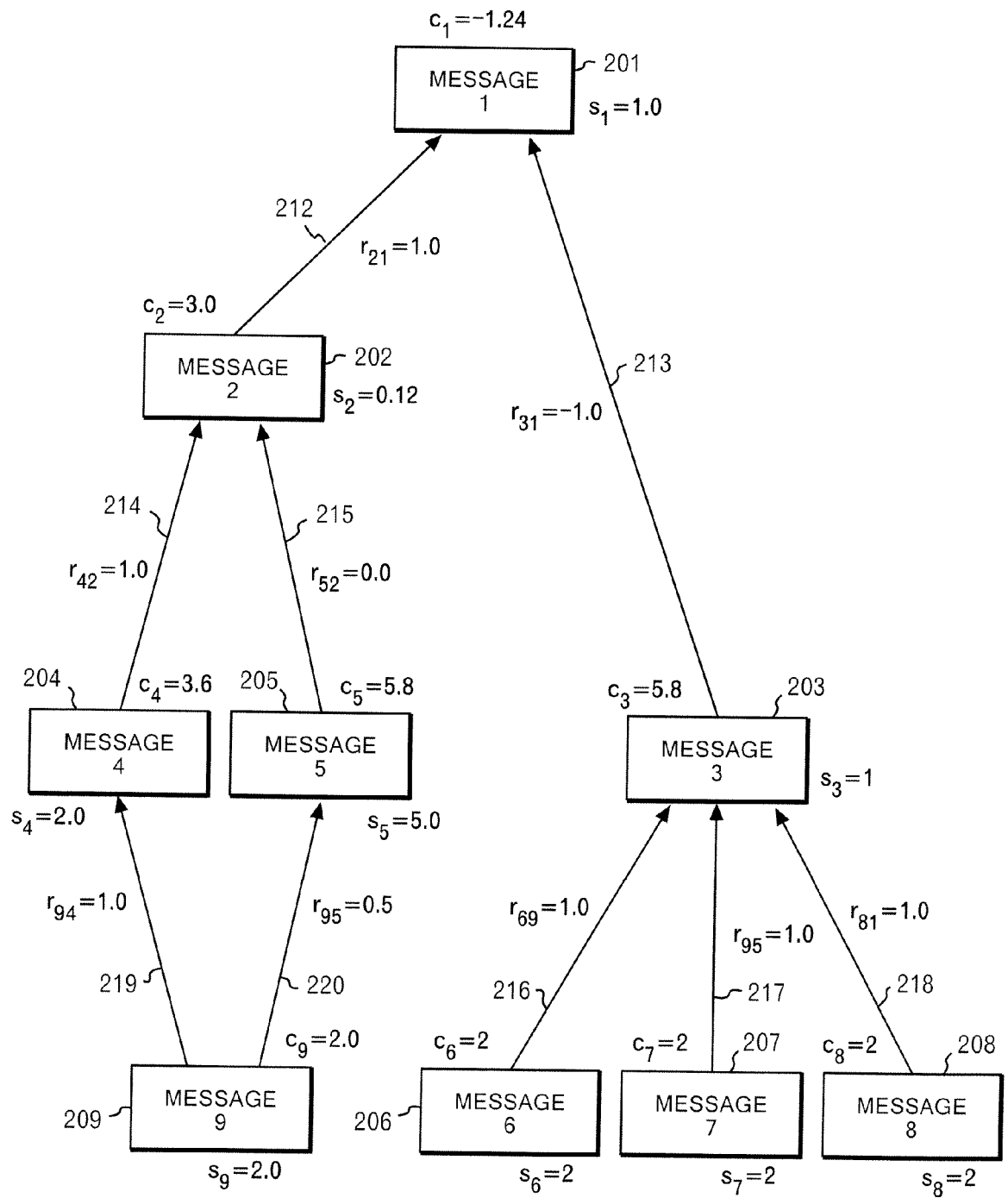
FIG. 7 is an example of the total importance of a message, which is calculated by the computer apparatus 100 according to the present invention.

FIG. 7 shows the results of determining the total importance of each message by the computer apparatus 100 of the present invention for the discussion graph illustrated in FIG. 2.

The attenuation factor a is set to 0.8.

The total importance of the message 1 is −1.24. This is because the contents of the message 3, which makes a comment on (references) the message 1, is critical. To be precise, being critical indicates that the response coefficient $r_{31}$ is a negative value. Moreover, the message 3 receives agreeing (r is a positive value) responses from three of the messages 6, 7, and 8. In other words, the message 1 is directly criticized by the message 3, and further the message 1 is indirectly criticized by the messages 6, 7, and 8. Due to these circumstances, the total importance of the message 1 is evaluated to be relatively low among the message group.

On the other hand, the total importance of the message 5 is 5.8, and indicates a relatively high value. This results from the contents themselves of the message 5 being valuable (s=5.0). However, the response to the message 5 is one, and it is conceivable that the total importance can be changed depending on the future growth of the discussion graph.

Although the preferred embodiment of the present invention has been described in detail, it should be understood that various changes, substitutions and alternations can be made therein without departing from spirit and scope of the inventions as defined by the appended claims.

As described above, according to the computer apparatus of the present invention, it is possible to automatically identify messages which agree with the interests of a user from among a massive number of messages. In this manner, the computer apparatus of the present invention is expected to be applied to the fields of new product development, marketing, company's risk management, and the like.

We claim:

1. A computer program product comprising:
a non-transitory computer useable storage medium including a computer readable program,
wherein the computer readable program when executed on a computer causes the computer to function as a system for calculating total importance of each of electronic documents, based on (i) a plurality of electronic documents chained to each other in a relation of referencing, from a start electronic document which is not referenced by any other electronic document to a terminal electronic document which does not reference any other document, (ii) information on relation of referencing and being referenced, (iii) an important phrase, and (iv) a response coefficient determining phrase, (i) through (iv) being stored in a storage device, the computer program causing a computer to
- (a) calculate importance of a given electronic document among the plurality of electronic documents, on the basis of the degree of similarity between the important phrase and a phrase included in the given electronic document;
- (b) identify at least one second electronic document which references the given electronic document, on the basis of information referenced;
- (c) calculate a response coefficient against a first electronic document, on the basis of a degree of similarity between a phrase included in the second electronic document and the response coefficient determining phrase;
- (d) calculate the total importance of the given electronic document, based on importance unique to one electronic document of the given electronic document, and total importance of the second electronic document; and
- (e) calculate the total importance of each of the plurality of electronic documents, by applying (a) to (d) to each of a plurality of pairs of the plurality of electronic documents.

2. The computer program product according to claim 1, wherein calculating the total importance of each of the plurality of electronic documents includes calculating the total importance of each of the electronic documents, by sequentially applying (a) to (d) to each of a plurality of pairs of the chained electronic documents, starting from a pair of the start electronic document and an electronic document that the start electronic document references toward the terminal electronic document along the chain.

3. The computer program product according to claim 1, wherein calculating the total importance of the given electronic document includes calculating the total importance of the given electronic document, on the basis of: values obtained by previously assigning predetermined weights to the response coefficient and the total importance of the other electronic document, respectively; and the importance unique to one electronic document of the given electronic document.

4. The computer program product according to claim 3, wherein 0<assigned weights<1.

5. The computer program product according to claim 1, wherein when there is no electronic document which references one of the plurality of pairs of the plurality of electronic documents, calculating the total importance of each of the electronic documents includes calculating the total importance of each of the electronic documents consisting the pair, by performing (a) through (d) on the pair of electronic documents, while using the importance unique to one electronic document of the one of the pair of electronic documents as the total importance thereof.

6. The computer program product according to claim 1, wherein when there are a plurality of electronic documents which reference one of the plurality of pairs of the plurality of electronic documents, calculating the total importance of each of the electronic documents includes calculating the total importance of the one of the pair of electronic documents, on the basis of the total importance of each of the plurality of referencing electronic documents.

7. The computer program product according to claim 6, wherein calculating the total importance includes calculating the total sum of the total importance of each of the referencing electronic documents as the total importance of the one of the plurality of pairs of the plurality of electronic documents.

8. The computer program product according to claim 1, wherein the response coefficient determining phrase includes at least one of (i) an agreeing phrase, (ii) a disagreeing phrase, and (iii) a topic change phrase.

9. The computer program product of claim 1, including:
sequentially applying the equation $c_i = s_i + a \times r_{ij} \times c_j$ to pairs of the plurality of the electronic documents.

10. The computer program product of claim 9, wherein calculating the total importance of each of the plurality of electronic documents includes calculating the total importance of each of the electronic documents, by sequentially applying (a) to (d) to each of a plurality of pairs of the chained electronic documents, starting from a pair of the start electronic document and an electronic document that the start electronic document references toward the terminal electronic document along the chain.

11. The computer program product according to claim 9, wherein calculating the total importance of the given electronic document includes calculating the total importance of the given electronic document, on the basis of values obtained by previously assigning predetermined weights to the response coefficient and the total importance of the other electronic document, respectively, and the importance unique to one electronic document of the given electronic document.

12. The computer program product according to claim 9, wherein 0 < assigned weights <1.

13. A method for calculating the importance of at least one of a plurality of electronic documents, based on (i) a plurality of electronic documents, (ii) information on referencing relation between each pair of the electronic documents, (iii) an important phrase, and (iv) a response coefficient determining phrase, (i) through (iv) being stored in a storage device, the method comprising:
- (a) calculating importance unique to one electronic document of a given electronic document among the plurality of electronic documents, on the basis of the degree of similarity between the important phrase and a phrase included in the given electronic document;
- (b) identifying at least one of other electronic documents which references the given electronic document, on the basis of the reference information;
- (c) calculating a response coefficient against the given electronic document, on the basis of at least one of the degrees of similarities between a phrase included in the other electronic documents and the response coefficient determining phrase;
- (d) calculating total importance of the given electronic document, on the basis of the importance unique to one electronic document of the given electronic document, the response coefficient, and total importance of the other electronic documents; and
- (e) calculating a total importance of each of the electronic documents in an electronic document group in which the given electronic document and the other electronic documents are directly and indirectly linked to each other on the basis of the reference information through relations of referencing and being referenced, by performing (a) through (d) on each pair of electronic documents having a mutual relation of directly referencing and being referenced in the electronic document group.

14. The method of claim 13, including sequentially applying the equation $c_i=s_i+a\times r_{ij}\times c_j$ to pairs of the plurality of the electronic documents.

15. A computer apparatus for calculating importance of at least one of a plurality of electronic documents, based on (i) a plurality of electronic documents, (ii) reference information between each of the electronic documents, (iii) an important phrase, and (iv) a response coefficient determining phrase, (i) through (iv) being stored in a storage device, the computer apparatus comprising:
   (a) means for calculating importance unique to one electronic document of a given electronic document among the plurality of electronic documents, based on degree of similarity between the important phrase and a phrase included in the given electronic document;
   (b) means for identifying at least one of other electronic documents which references the given electronic document, on the basis of the reference information;
   (c) means for calculating a response coefficient against the given electronic document, on the basis of at least one of the degrees of similarities between a phrase included in the other electronic documents and the response coefficient determining phrase;
   (d) means for calculating total importance of the given electronic document, on the basis of the importance unique to one electronic document of the given electronic document, the response coefficient, and the total importance of the other electronic documents; and
   (e) means for calculating total importance of each of the electronic documents in an electronic document group in which the given electronic document and the other electronic documents are directly or indirectly linked to each other on the basis of the reference information, through relations of referencing and being referenced, by recursively applying the means (a) to (d) to each pair of electronic documents in a mutual relation of directly referencing and being referenced in the electronic document group.

16. The computer apparatus of claim 15, including means for sequentially applying the equation $c_i=s_i+a\times r_{ij}\times c_j$ to pairs of the plurality of the electronic documents.

17. A computer program product comprising:
   a non-transitory computer useable storage medium including a computer readable program,
   wherein the computer readable program when executed on a computer causes the computer to function as a system for calculating total importance of each of a plurality of electronic documents on the basis of: a plurality of electronic documents, chained to each other in a relation of referencing and being referenced from a start electronic document which is not referenced by any other electronic document to a terminal electronic document which does not reference any other document, an important phrase, and a response coefficient determining phrase, all of which are stored in a storage device, the computer program causing a computer to perform:
   (a) calculating the total importance of a start electronic document, on the basis of the degree of similarity between the important phrase and a phrase included in the start electronic document; and
   (b) calculating the total importance of each of the plurality of electronic documents having a relation of referencing and being referenced in the chain of the electronic documents, by sequentially applying an equation $c_i=s_i+a\times r_{ij}\times c_j$ to pairs of electronic documents, in a direction from a pair of the start electronic document and another electronic document that the start electronic document references to the terminal electronic document,
   where $c_i$ is the total importance of an i-th electronic document in the chain of the electronic documents,
   $s_i$ is the importance unique to one electronic document of the i-th electronic document, and is calculated on the basis of the degree of similarity between a phrase included in the i-th electronic document and the important phrase,
   a is a number which satisfies $0<a<1$,
   $r_{ij}$ is a response coefficient which is calculated on the basis of the degree of similarity between a phrase included in the j-th electronic document and the response coefficient determining phrase, wherein j-th electronic document directly references and is a response to the i-th electronic document, and
   $c_j$ is the total importance of the j-th electronic document.

18. The computer program according to claim 17, wherein the response coefficient $r_{ij}$ is the total sum of the degrees of similarities of the phrase included in the j-th electronic document to an agreeing phrase, a disagreeing phrase and a topic change phrase,
   the degree of similarity to the agreeing phrase is a positive number of an amount corresponding to the degree of similarity,
   the degree of similarity to the disagreeing phrase is a negative number of an amount corresponding to the degree of similarity, and
   the degree of similarity to the topic change phrase is 0.

19. A computer program product comprising a non-transitory computer useable storage medium including a computer readable program, wherein the computer readable program when executed on a computer causes the computer to:
   calculate the total importance of each of electronic documents, on the basis of
   (i) a plurality of electronic documents, chained to each other in a relation of referencing and being referenced, from a start electronic document which is not referenced by any other electronic document to a terminal electronic document which does not reference any other document,
   (ii) information on relation of referencing and being referenced,
   (iii) a first phrase, and
   (iv) a second phrase, (i) through (iv) being stored in a storage device, the computer program including instructions to cause a computer to:
   (a) calculate the importance unique to one electronic document of a given electronic document among the plurality of electronic documents, on the basis of the degree of similarity between the first phrase and a phrase included in the given electronic document, and by sequentially applying an equation to pairs of the plurality of the electronic documents;
   (b) identify at least one second electronic document which references the given electronic document, on the basis of the information on relation of referencing and being referenced;
   (c) calculate a response coefficient against a first electronic document, on the basis of the degree of similarity between a phrase included in the second electronic document and the second phrase;
   (d) calculate the total importance of the given electronic document, on the basis of the importance unique to one electronic document of the given electronic document and total importance of the second electronic document; and (e) calculate the total importance of each of the plurality of electronic documents, by performing (a) through (d) on each pair of the plurality of electronic documents.

20. The computer program product of claim 19, including: sequentially applying the equation $c_i = s_i + a \times r_{ij} \times c_j$ to pairs of the plurality of the electronic documents.

* * * * *